United States Patent

Kealy

[15] 3,697,979

[45] Oct. 10, 1972

[54] DIGITAL ACTUATORS

[72] Inventor: Wellesley Ashe Kealy, Lymm, England

[73] Assignee: United Kingdom Atomic Energy Authority, London, England

[22] Filed: Jan. 18, 1971

[21] Appl. No.: 107,041

[30] Foreign Application Priority Data

Jan. 20, 1970 Great Britain............2,783/70

[52] U.S. Cl..............340/347 DA, 235/152, 318/600

[51] Int. Cl...............................................G08c 5/00

[58] Field of Search........235/152, 164; 340/347 AA; 92/13, 13.4, 13.7, 13.8; 310/14; 318/573, 604

[56] References Cited

UNITED STATES PATENTS

| | | | |
|---|---|---|---|
| 3,042,121 | 7/1962 | Broetzman et al. | 92/13.7 X |
| 3,195,111 | 7/1965 | Kunkel | 318/573 X |
| 3,219,854 | 11/1965 | McLaughlin | 340/347 DA |
| 3,297,924 | 1/1967 | Kamm | 318/573 |
| 3,303,492 | 2/1967 | Cross | 340/347 DA |
| 3,430,120 | 2/1969 | Kotaka et al. | 340/347 DA |

*Primary Examiner*—Martin P. Schwadron
*Assistant Examiner*—Leslie J. Payne
*Attorney*—Larson, Taylor & Hinds

[57] ABSTRACT

A digital actuator wherein a mechanical displacement of an output member is related to the digital input of a number of input members which are preferably an array of linked binary units. Loading means are provided urging the input members and the output member to a datum limiting position. An auxiliary transducer is also provided which can override the loading means and effect displacement of all the members to a second position in which each individual input member may receive a signal serving to retain it there when the auxiliary transducer ceases to override the loading means.

5 Claims, 3 Drawing Figures

DIGITAL ACTUATORS

BACKGROUND OF THE INVENTION

This invention relates to digital actuators.

In the application of direct digital control to process plant it is necessary to provide a means of converting the digital control instructions emanating from computing apparatus to an analogue signal appropriate to the final element employed to control the plant. For this purpose digital actuators are known to produce a mechanical displacement of an output member, which is related to the digital input of a member of input members.

SUMMARY OF THE INVENTION

According to the present invention a digital actuator wherein a mechanical displacement of an output member is related to the digital input of a number of input members and loading means are provided urging the input members and the output member to a datum position, termed the first limiting position, includes an auxiliary transducer adapted to override the loading means and effect displacement of all the members to a second limiting position, in which position each individual input member may receive a signal serving to retain it there when the auxiliary transducer ceases to override the loading means.

The invention has particular application to a digital actuator having an array of linked binary units comprising input members each contributing uniquely to the displacement of the output member and being retainable in its second position by attraction forces between an armature and an electro-magnet since the invention can exploit the known fact that a smaller signal is required to retain an armature to the energized position. Hence the problem of attracting an armature over progressively longer distances to effect greater displacements can be overcome.

Typically the auxiliary transducer may be an electrical solenoid which is energized for a short period. Alternatively the auxiliary transducer may be a pneumatic or hydraulic cylinder, an electric motor with suitable gearing or a linear motor.

In all cases a magnetic or other form of brake may be included to lock the output member once it has taken up its correct position.

In an embodiment of the invention, here described only by way of example, a digital actuator according to the invention is used for the numerical control of machine tools for positioning a workpiece or tool relative to some datum position.

DESCRIPTION OF THE DRAWINGS

An embodiment of the invention will now be described with reference to the accompanying drawings which are side views partly sectioned.

DESCRIPTION OF THE PREFERRED EMBODIMENT

Figures 1, 2, 3:
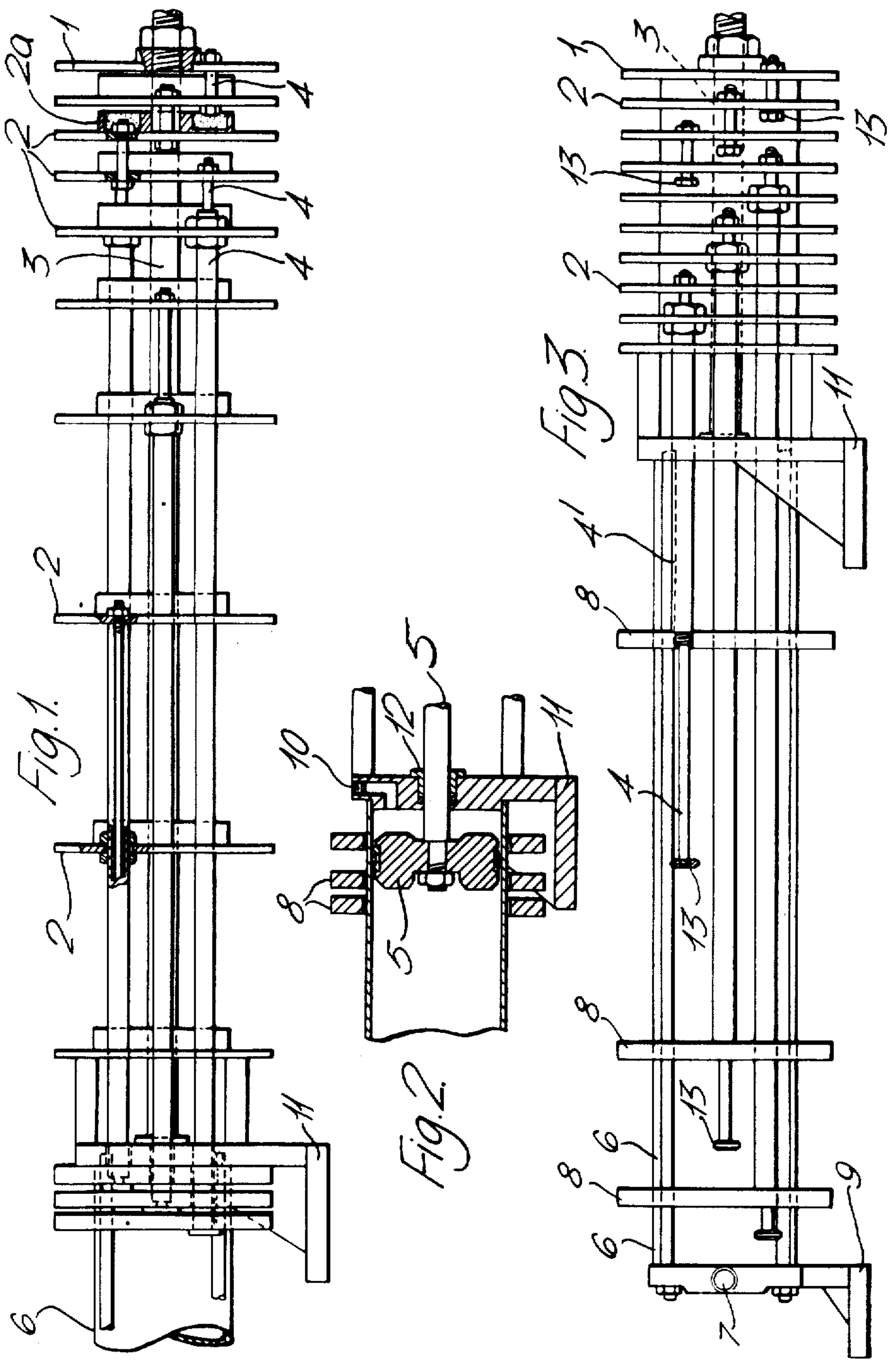
FIG. 1 shows an actuator in its first limiting position.
FIG. 2 shows a section of a detail of FIG. 1.
FIG. 3 shows the actuator of FIG. 1 in its second limiting position.

FIGS. 1 and 3 of the drawings show a number of circular electromagnets 2, each with an associated coil 2*a*.

The magnets form the input members of the actuator and are loosely mounted on a shaft 3 forming the output member. A pole piece 1 is rigidly fixed to one end of the shaft 3. The opposite end of the shaft 3 has an attached piston 5 (FIG. 2) in a double-acting pneumatic cylinder 6 forming both the loading means and the auxiliary transducer. The cylinder has at one end a first pressurizing duct 7 extending through amounting 9 for the cylinder and connecting with a compressed air reservoir (not shown). At the other end of the cylinder 6 is a second pressurizing duct 10 extending through a mounting 11 for the cylinder. The shaft 3 is sealed in the mounting 11 by a gland 12.

The electromagnets 2 are free to slide axially on the shaft 3 but their degree of travel relative to one another and the pole piece 1 is limited by a series of rods 4 provided with stops 13. Each electromagnet is individually mounted on a separate one of these rods 4. The lengths of the rods 4 and the degree of travel they permit are arranged according to some predetermined code, for example, a binary progression. Guide collars 8 are provided for the rods 4 outside the pneumatic cylinder 6.

In operation compressed air is supplied to the right hand side of the piston 5 through the duct 10. This causes the piston 5 and the shaft 3 to move to the left and close the gaps between all the electro-magnets. FIG. 3 shows the actuator in this closed position. The electro-magnets appropriate to the code and travel required are then electrically energized and the right hand side of the piston 5 is opened to atmosphere so that compressed air in the reservoir is applied to the left hand side of the piston 5 through the duct 7. This causes the piston 5 and the shaft 3 to move to the right, the degree of movement being determined by the sum of the permissible movement of those electro-magnets which are not energized. The permissible travel of the individual electro-magnets is determined by the stops 13 and hence by the length of the rods 4 which carry them.

If the actuator is required to move heavy loads quickly the inertia when the load is brought to rest could under some circumstances cause the energized magnets to be pulled apart. This problem can be overcome by the use of a damping device which is arranged to come into operation just prior to the actuator reaching the limit of its travel. The damping device may comprise an additional hydraulic cylinder alongside the actuator or shut-off valves in the compressed air supply.

Actuation of the damping could be by a switch which operates when the thrust of the shaft 3 against the pole piece 1 exceeds a predetermined value. Adjustment of the point at which the camping device operates may be achieved by providing some free axial movement between the shaft 3 and pole piece 1.

Some form of brake may be provided to lock the shaft 3 once it has taken up the required position.

I claim:

1. A digital actuator including a plurality of input members disposed in a linear array, an output member the mechanical displacement of which is related to a digital input to a selected number of input members, and loading means for urging the input members and the output members to an extended datum position, termed the first limiting position, said actuator being characterized by the provision of an auxiliary transducer for overriding the loading means and effecting compaction of all of the members to a second limiting position, each said input member including electromagnetic means for receiving a signal when said members are in said second limiting position which causes that member to be retained against an adjacent member in the array when the auxiliary transducer ceases to override the loading means.

2. A digital actuator according to claim 1 wherein said input members comprise an array of linked binary units each of which contributes uniquely to the displacement of the output member.

3. A digital actuator as claimed in claim 1 wherein each said electromagnetic means includes an armature and an electromagnet, each of the input members being retainable in the second limiting position thereof by the forces between an adjacent armature and electromagnet.

4. A digital actuator according to claim 1 wherein said auxiliary transducer includes a pneumatic cylinder.

5. A digital actuator according to claim 1 wherein said auxiliary transducer includes a hydraulic cylinder.

* * * * *